(12) United States Patent
Mutter et al.

(10) Patent No.: US 11,706,049 B2
(45) Date of Patent: *Jul. 18, 2023

(54) SUBSCRIBER STATION FOR A SERIAL BUS SYSTEM AND METHOD FOR COMMUNICATION IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 30 days.

This patent is subject to a terminal disclaimer.

(21) Appl. No.: 17/593,634

(22) PCT Filed: Mar. 20, 2020

(86) PCT No.: PCT/EP2020/057889
§ 371 (c)(1),
(2) Date: Sep. 22, 2021

(87) PCT Pub. No.: WO2020/193440
PCT Pub. Date: Oct. 1, 2020

(65) Prior Publication Data
US 2022/0070020 A1 Mar. 3, 2022

(30) Foreign Application Priority Data
Mar. 26, 2019 (DE) ..................... 10 2019 204 115.9

(51) Int. Cl.
*H04L 12/40* (2006.01)

(52) U.S. Cl.
CPC .. *H04L 12/40052* (2013.01); *H04L 12/40013* (2013.01); *H04L 2012/40215* (2013.01); *H04L 2012/40273* (2013.01)

(58) Field of Classification Search
CPC .......... H04L 12/4013; H04L 12/40013; H04L 12/40071; H04L 12/40052; H04L 2012/40273; H04L 2012/40215
See application file for complete search history.

(56) References Cited

U.S. PATENT DOCUMENTS

| 8,819,466 | B2 * | 8/2014 | Hartwich | .......... H04L 12/40039 713/323 |
| 8,989,210 | B2 * | 3/2015 | Hartwich | .......... H04L 12/40039 370/458 |

(Continued)

FOREIGN PATENT DOCUMENTS

| CN | 103264673 A | 8/2013 |
| CN | 104620542 A | 5/2015 |

(Continued)

OTHER PUBLICATIONS

International Search Report for PCT/EP2020/057889 dated Jun. 10, 2020.
ISO 11898-1:2015(E) Standard, 2015, pp. 1-74.

*Primary Examiner* — Henry Tsai
*Assistant Examiner* — Christopher A Daley
(74) *Attorney, Agent, or Firm* — Norton Rose Fulbright US LLP; Gerard Messina

(57) ABSTRACT

A subscriber station for a serial bus system including a communication control device for controlling a communication with another subscriber station and a transceiver device for sending a transmit signal produced by the communication control device as a frame to a bus of the bus system. The bit time of a signal sent to the bus in the first communication phase differs from a bit time of a signal sent in the second communication phase. The communication control device produces the transmit signal, in a first operating mode, for a first frame that is designed according to a specified communication protocol with which other sub- (Continued)

scriber stations in the bus system communicate, and is designed to produce the transmit signal, in a second operating mode, for a second frame that assigns to at least one bit a different function than is assigned to the bit in the specified communication protocol.

11 Claims, 5 Drawing Sheets

(56) References Cited

U.S. PATENT DOCUMENTS

| | | | |
|---|---|---|---|
| 11,487,687 B2 * | 11/2022 | Mutter | H04L 25/0264 |
| 11,489,694 B2 * | 11/2022 | Mutter | H04L 12/40097 |
| 2012/0210154 A1 * | 8/2012 | Hartwich | H04L 12/40039 |
| | | | 713/323 |
| 2018/0069723 A1 | 3/2018 | Beckmann et al. | |
| 2018/0205572 A1 * | 7/2018 | Kishigami | H04L 25/0272 |
| 2020/0195239 A1 * | 6/2020 | Wang | H03K 3/017 |

FOREIGN PATENT DOCUMENTS

| | | |
|---|---|---|
| CN | 105103499 A | 11/2015 |
| CN | 105324960 A | 2/2016 |
| DE | 102017211860 B3 | 9/2018 |
| EP | 2247075 A1 | 11/2010 |
| EP | 2521319 A1 | 11/2012 |

* cited by examiner

SUBSCRIBER STATION FOR A SERIAL BUS SYSTEM AND METHOD FOR COMMUNICATION IN A SERIAL BUS SYSTEM

FIELD

The present invention relates to a subscriber station for a serial bus system and to a method for communication in a serial bus system, with which, in addition to pure data transport, other functions are also supported, such as safety (functional safety), security (data security), and QoS (quality of service, such as guarantee of a maximum latency for a frame, time synchronization of the subscriber stations (nodes) in the bus system).

BACKGROUND INFORMATION

For communication between sensors and control devices, for example in vehicles, for cost reasons instead of a point-to-point connection currently a bus system is more and more frequently used, in which data are transmitted as messages in the standard ISO 11898-1:2015, as CAN protocol specification, using CAN FD. The messages are transmitted between the subscriber stations of the bus system, such as sensor, control device, setpoint generator, etc. Here, CAN FD is currently used in the introduction phase in the first step, usually with a data bit rate of 2 Mbit/s in the transmission of bits of the data field, and with an arbitration bit rate of 500 kbit/s in the transmission of bits of the arbitration field in the vehicle.

Information is increasingly exchanged over such a bus system. In particular, in addition to pure data transport other functions are also to be supported, such as safety (functional safety), security (data security), and QoS (quality of service, such as guarantee of a maximum latency for a frame, time synchronization of the subscriber stations (nodes) in the bus system). There is also the desire on the part of the user to further increase the data rate in the bus system in order to at least maintain the speed of data transmission in the bus system, and, to the extent possible, to further increase it.

For this purpose, it is possible to share with the receiving node the information that is in a frame sent via the bus. In classical CAN and CAN FD, the content of a frame is communicated via a frame identifier (ID) that is also used for arbitration. This works in principle because each subscriber station (node) sends frames having exclusive frame identifiers. This corresponds to a flat allocation of frame identifiers and content.

The more information is communicated to the receiving node concerning the frame sent via the bus, the more bits have to be reserved for the frame identifier and then transmitted via the bus. However, because an arbitration bit is significantly longer than a data bit, this decreases the net data rate.

SUMMARY

It is an object of the present invention to provide a subscriber station for a serial bus system, and a method for communication in a serial bus system, that solve the problems named above. In particular, a subscriber station for a serial bus system, and a method for communication in a serial bus system, are to be provided in which as much information as possible is capable of being communicated via the data of a frame sent via the bus, without thereby reducing the previous data rate for a frame, and without thereby losing compatibility with earlier communication versions of the subscriber station, so that an increase in the quantity of useful data per frame can be realized, compared to earlier communication versions of the subscriber station.

The object may be achieved by a subscriber station for a serial bus system in accordance with an example embodiment of the present invention. In accordance with an example embodiment of the present invention, the subscriber station has a communication control device for controlling a communication of the subscriber station with at least one other subscriber station of the bus system, and a transceiver device for sending a transmit signal, produced by the communication control device, as a frame to a bus of the bus system, such that for a frame that is exchanged between subscriber stations of the bus system, the bit time of a signal sent to the bus in the first communication phase differs from a bit time of a signal sent in the second communication phase, the communication control device being designed to produce the transmit signal, in a first operating mode, for a first frame that is designed according to a specified communication protocol with which other subscriber stations in the bus system communicate, and the communication control device being designed to produce the transmit signal, in a second operating mode, for a second frame that assigns to at least one bit a different function than is assigned to the bit in the specified communication protocol.

Based on the design of the subscriber station, an identifier at the beginning of the frame is extensible by one bit without lengthening the first communication phase, which in CAN is the arbitration phase, and without impairing the compatibility with earlier versions of the communication protocol, which can be in particular CAN FD.

In this way, the identifier can be also be used in the CAN FD successor format in the way that has been standard in CAN until now. That is, the identifier gives information about the sender, the content, and the priority of the message.

Therefore, with the subscriber station, the frame identifier can be extended, and thus more information about the frame can be stored therein without having to add bits, thus reducing the net data rate.

In this way, the user can flexibly decide how much information about the content of the frame is to be communicated already at the beginning of the frame. Independent of the result of the decision, or the configuration of the communication control device or the changeover to the second operating mode, the frame is however also compatible with all current versions of a frame specification for the bus system.

In this way, the user is provided with a very flexible and uncomplicated possibility for adapting the subscriber station, and thus also the bus system, to the respective application without a large outlay.

As a consequence, with the subscriber station a transmission and receiving of the frame is ensured, even given an increase in the data rate, with great flexibility with regard to new additional functions of the bus system, and with a low error rate.

Here, with the subscriber station in the bus system, it is in particular possible in a first communication phase to retain an arbitration available in CAN, and nonetheless to further significantly increase the transmission rate in comparison with CAN or CAN FD.

The method carried out by the subscriber station can also be used if in the bus system there is also at least one CAN subscriber station and/or at least one CAN FD subscriber station that send messages according to the CAN protocol and/or CAN FD protocol.

Advantageous further embodiments of the subscriber station in accordance with the present invention are disclosed herein.

The at least one bit can have the bit time of the first communication phase.

It is possible for the at least one bit in the first frame to have a control function and to have a fixed value defined in the specified communication protocol, the at least one bit in the second frame having the function of the least significant bit of an identifier that in the second frame is situated directly after a bit that signals the start of the frame.

In another embodiment of the present invention, it is possible for the identifier of the first frame to indicate the priority of the message, and for the identifier of the second frame to include information about the sender, the content, and the priority of the message.

In another embodiment of the present invention, the at least one bit has at least one format changeover bit to which specified values are assigned for the changeover between the first and second communication phase in the communication protocol.

It is possible that the at least one format changeover bit has the FDF bit and/or the FXF bit of a CAN FX frame.

In addition, the subscriber station can have a protocol extension block for evaluating the field for the data type and the optionally present additional field for a data type in the useful data, and for carrying out the required handling of the message on the basis of an evaluation result.

It is possible that the frame formed for the message is made so as to be compatible with CAN FD.

It is possible that in the first communication phase it is negotiated which of the subscriber stations of the bus system receives, in the subsequent, second communication phase, an access to the bus that is at least at times exclusive and is collision-free.

The subscriber station described above can be part of a bus system that in addition includes a bus and at least two subscriber stations that are connected to one another via the bus in such a way that they can communicate serially with one another. Here, at least one of the at least two subscriber stations is a subscriber station as described above.

The object mentioned above may also be achieved by a method for communication in a serial bus system in accordance with an example embodiment of the present invention. In accordance with an example embodiment of the present invention, the method is carried out with a subscriber station of the bus system that has a communication control device and a transceiver device, the method having the steps of controlling, with the communication control device, a communication of the subscriber station with at least one other subscriber station of the bus system, and transmitting, with the transceiver device, a transmit signal produced by the communication control device as a frame to a bus of the bus system, such that for a frame exchanged between subscriber stations of the bus system the bit time of a signal sent to the bus in the first communication phase differs from a bit time of a signal sent in the second communication phase, the communication control device producing the transmit signal, in a first operating mode, for a first frame that is designed according to a specified communication protocol with which other subscriber stations in the bus system communicate, and the communication control device, in a second operating mode, producing the transmit signal for a second frame that assigns to at least one bit a different function than is assigned to the bit in the specified communication protocol.

The method offers the same advantages as those stated above with reference to the subscriber station.

Further possible implementations of the present invention include combinations not explicitly named of features or specific embodiments described above or in the following relating to the exemplary embodiments. Here, the person skilled in the art will also add individual aspects to the respective basic form of the present invention as improvements or supplements, in view of the disclosure herein.

BRIEF DESCRIPTION OF THE DRAWINGS

In the following, the present invention is described in more detail with reference to the figures and on the basis of exemplary embodiments.

In the Figures, identical or functionally identical elements have been provided with the same reference characters, unless otherwise indicated.

DETAILED DESCRIPTION OF EXAMPLE EMBODIMENTS

Figure 1:
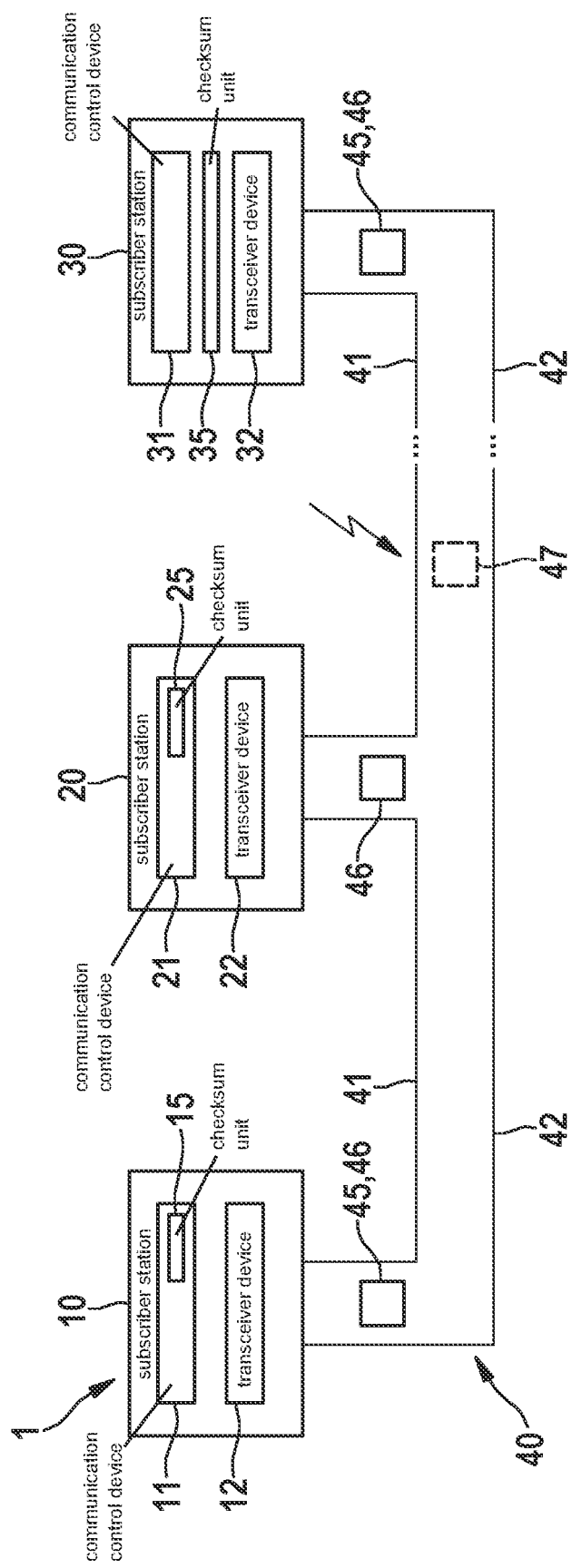
FIG. 1 shows a simplified schematic diagram of a bus system according to a first exemplary embodiment of the present invention.

FIG. 1 shows as an example a bus system 1 that is in particular fundamentally designed for a CAN bus system, a CAN FD bus system, a CAN FX bus system, and/or modifications thereof, as described below. Bus system 1 can be used in a vehicle, in particular a motor vehicle, an aircraft, etc., or in a hospital, etc.

In FIG. 1, bus system 1 has a multiplicity of subscriber stations 10, 20, 30, each connected to a bus 40 by a first bus lead 41 and a second bus lead 42. Bus leads 41, 42 can also be designated CAN_H and CAN_L, or CAN-FX_H and CAN-FX_L, and are used for electrical signal transmission after the coupling in of the dominant level, or the production of recessive levels for a signal in the transmit state. Via bus 40, messages 45, 46 are serially transmissible in the form of signals between the individual subscriber stations 10, 20, 30. If an error occurs in communication on bus 40, as shown by the jagged arrow in FIG. 1, then optionally an error frame 47

(error flag) can be sent. Subscriber stations 10, 20, 30 are for example control devices, sensors, display devices, etc., of a motor vehicle.

As shown in FIG. 1, subscriber station 10 has a communication control device 11, a transceiver device 12, and a checksum unit 15. Subscriber station 20 has a communication control device 21, a transceiver device 22, and a checksum unit 25. Subscriber station 30 has a communication control device 31, a transceiver device 32, and a checksum unit 35. Transceiver devices 12, 22, 32 of subscriber stations 10, 20, 30 are each connected directly to bus 40, even if this is not illustrated in FIG. 1.

Communication control devices 11, 21, 31 are each used to control a communication of the respective subscriber station 10, 20, 30 via bus 40 with at least one other subscriber station of subscriber stations 10, 20, 30 that are connected to bus 40.

Communication control devices 11, 31 create and read first messages 45, which are for example modified CAN messages 45.

Here, the modified CAN messages 45 are constructed on the basis of a CAN FX format that is described in more detail with reference to FIG. 2, and in which the respective checksum unit 15, 35 is used. Communication control devices 11, 31 can in addition be designed to provide, as needed, a CAN FX message 45 or a CAN FD message 46 for transceiver devices 12, 32, or to receive them therefrom. Here as well, the respective checksum units 15, 35 are used. Communication control devices 11, 31 thus create and read a first message 45 or a second message 46, first and second messages 45, 46 differing in their data transmission standard, namely in this case CAN FX or CAN FD.

Communication control device 21 can be realized as a conventional CAN controller according to ISO 11898-1: 2015, i.e., as a CAN FD-tolerant classical CAN CAN controller or a CAN FD controller. Communication control device 21 creates and reads second messages 46, for example CAN FD messages 46. CAN FD messages 46 can include a number of from 0 to 64 data bytes that are, in addition, transmitted with a significantly faster data rate than in the case of a classical CAN message. In particular, communication control device 21 is realized as a conventional CAN FD controller.

Transceiver device 22 can be realized as a conventional CAN transceiver according to ISO 11898:1:2015, or as a CAN FD transceiver. Transceiver devices 12, 32 can be designed to provide, as needed, messages 45 according to the CAN FX format or messages 46 according to the current CAN FD format for the associated communication control device 11, 31, or to receive them therefrom.

With the two subscriber stations 10, 30, a formation and then transmission of messages 45 with the CAN FX format, and the receipt of such messages 45, can be realized.

Figure 2:
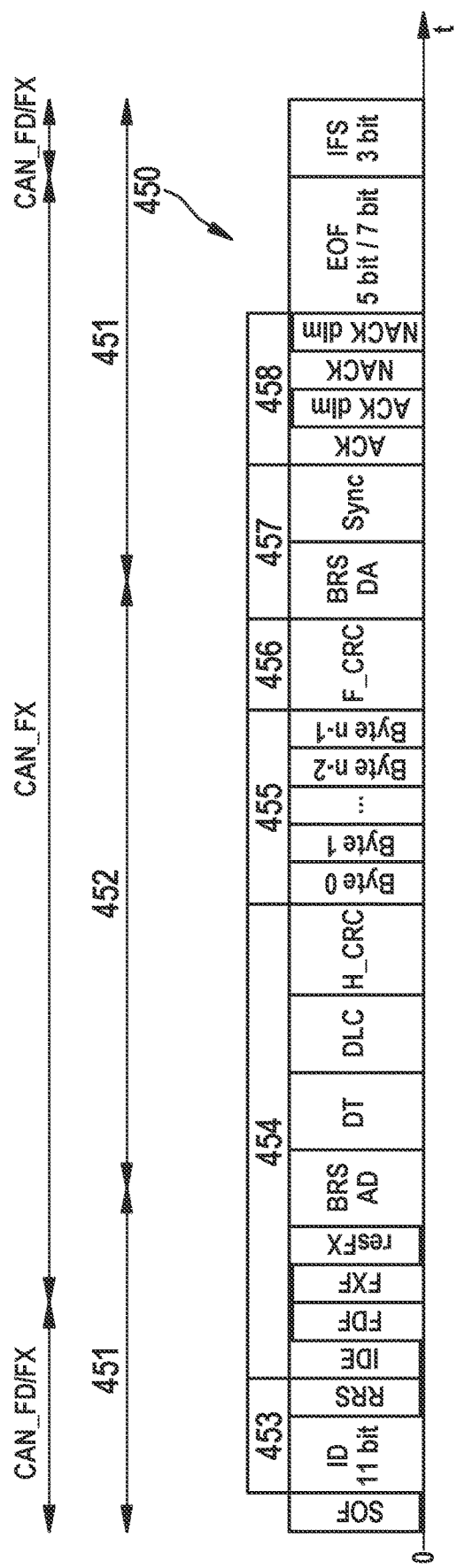
FIG. 2 shows a diagram illustrating the design of a message that can be sent by a subscriber station of the bus system according to the first exemplary embodiment in a first operating mode, in accordance with the present invention.

FIG. 2 shows, for message 45, a CAN FX frame 450 as is provided by communication control device 11, in a first operating mode, for transceiver device 12 for transmission to bus 40. Here, communication control device 11 creates frame 450 in the present exemplary embodiment as compatible with CAN FD, as is also shown in FIG. 2. The same holds analogously for communication control device 31 and transceiver device 32 of subscriber station 30.

Figure 3:
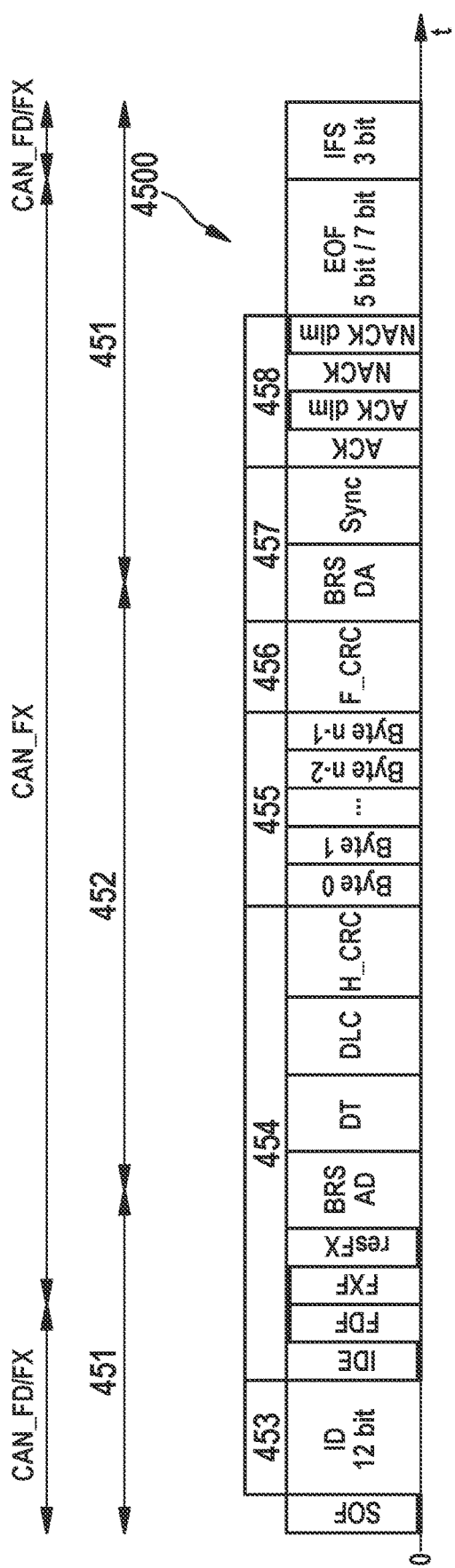
FIG. 3 shows a diagram illustrating the design of a message that can be sent by a subscriber station of the bus system of the first exemplary embodiment in a second operating mode, in accordance with the present invention.

FIG. 3 shows, for message 45, a frame 4500 to which a changeover can take place as an alternative to frame 450 shown in FIG. 2. In this way, in a second operating mode communication control device 11 can provide frame 450 for transceiver device 12 for transmission to bus 40. Differing from frame 450, which uses an identifier having 11 bits, frame 4500 has a CAN FX-extended frame format in which an identifier having 12 bits is used.

Both frames 450, 4500 according to FIG. 2 and FIG. 3 are identical up to the eleventh bit of the identifier (ID). However, communication control device 11 uses, in the second operating mode, the RRS bit of frame 450 as twelfth identifier bit. In this way, the identifier of frame 4500 can include information about the sender, content, and priority of frame 4500, or message 45. In contrast, the identifier of frame 450 includes only information about the priority of frame 450, or message 45. It is also possible for the priority of frame 450 to be used to infer the sender of frame 450 or message 45.

Otherwise, the two frames 450, 4500 are identical in their construction.

Frames 450, 4500 are compatible with CAN FD, because in frame 4500 the RRS bit is rededicated to the least significant bit LSB of the 12-bit identifier. After the changeover to the format of frame 4500, i.e., after changeover to the second operating mode, from the point of view of the CAN FX subscriber stations 10, 30 the first 12 bits which follow the SOF bit are identifier bits. The SOF bit signals the start of frame 450, 4500.

According to FIG. 2 and FIG. 3, for the CAN communication on bus 40, CAN FX frames 450, 4500 are divided into different communication phases 451, 452, namely an arbitration phase 451 and a data phase 452. Frame 450 has an arbitration field 453, a control field 454, a data field 455, a checksum field 456 for a checksum F_CRC, a synchronization field 457, and an acknowledgement field 458.

In arbitration phase 451, in the two frames 450, 4500, using the identifier (ID), in arbitration field 453 negotiation takes place bit-by-bit between subscriber stations 10, 20, 30, concerning which subscriber station 10, 20, 30 wishes to send message 45, 46 with the highest priority, and therefore, for the next period of time, will receive an exclusive access to bus 40 of bus system 1 for transmission in subsequent data phase 452.

With their 12-bit identifiers, frames 4500 arbitrate, in left-justified fashion, against the 11-bit identifier plus the dominant RRS bit of frame 450, or against CAN FD frames, for the next exclusive, collision-free access to bus 40.

The IDE bit is also not used as a recessive identifier bit in frame 4500, because it switches over a recessively sent IDE bit in the CAN FD format to a 29-bit identifier. Therefore, the IDE bit is sent as dominant.

In arbitration phase 451 of frames 450, 4500, a physical layer is used, as in CAN and CAN-FD. The physical layer corresponds to the bit transmission layer, or layer 1, of the conventional OSI (Open Systems Interconnection) model.

An important point during phase 451 is that the conventional CSMA/CR method is used, which permits simultaneous access by subscriber stations 10, 20, 30 to bus 40 without destroying the higher-prioritized message 45, 46. In this way, further bus subscriber stations 10, 20, 30 can be added relatively easily to bus system 1, which is very advantageous.

The CSMA/CR method has the consequence that there must be so-called recessive states on bus 40 that can be overwritten by other subscriber stations 10, 20, 30 with dominant states on bus 40. In the recessive state, high-ohmic conditions prevail at the individual subscriber station 10, 20, 30, which, in combination with the parasites of the bus wiring, results in longer time constants. This causes a limitation of the maximum bit rate of the current CAN-FD physical layer to, currently, about 2 megabits per second in real vehicle use conditions.

In data phase 452, in addition to a part of control field 454, the useful data of the CAN-FX frame or of message 45 can be sent from data field 455, as well as checksum field 456 for checksum F_CRC.

A sender of message 45 begins a sending of bits of data phase 452 to bus 40 only when subscriber station 10, as sender, has won the arbitration, and subscriber station 10, as sender, thus has exclusive access to bus 40 of bus system 1 for the transmission.

Quite generally, in the bus system with CAN FX, in comparison to CAN or CAN FD, the following differing properties can be realized:

a) taking over and, if warranted, adaptation of proven properties that are responsible for the robustness and user-friendliness of CAN and CAN FD, in particular a frame structure having an identifier and arbitration according to the CSMA/CR method, b) increase in the net data transmission rate, in particular to about 10 megabits per second, c) increasing the quantity of useful data per frame, in particular to about 4 kbytes.

As is shown in FIG. 2 and FIG. 3, in both operating modes subscriber station 10 uses, in part and in particular up to the FDF bit (inclusive), a format available CAN/CAN-FD according to ISO 11898-1:2015 for the creation of frames 450, 4500 in arbitration phase 451 as first communication phase. In contrast, subscriber station 10 uses, starting from the FDF bit in the first communication phase and in the second communication phase of data phase 452, a CAN FX format that is described below.

In the present exemplary embodiment, CAN FX and CAN FD are compatible. Here, the res bit from CAN FD, which in the following is called the FXF bit, is used for the changeover from the CAN FD format to the CAN FX format. Therefore, the frame formats of CAN FD and CAN FX are identical up to the res bit. A CAN FX subscriber station, i.e., here subscriber stations 10, 30, also supports CAN FD.

According to FIG. 2, frame 450, from the SOF bit up to and including the FDF bit, is identical to the CAN FD base frame format according to ISO 11898-1:2015. Therefore, the conventional design is not discussed further here. Frame 4500 according to FIG. 3 differs only in the function of the RRS bit, as described above. In frames 450, 4500, bits that are shown in FIG. 2, FIG. 3 with a thick stroke at their lower line are sent as dominant in frames 450, 4500. Moreover, in frames 450, 4500 bits that are shown in FIG. 2, FIG. 3 with a thick stroke at their upper line are sent in frames 450, 4500 as recessive.

In general, in the production of frames 450, 4500 two different stuffing rules are applied. Up to the FXF bit in control field 454, the dynamic bit stuffing rule of CAN FD is used, so that after 5 identical bits in sequence an inverse stuff bit is to be inserted. After an FX bit in control field 454, a fixed stuffing rule is used, so that after a fixed number of bits a fixed stuff bit is to be inserted. Alternatively, instead of only one stuff bit, 2 or more bits may be inserted as fixed stuff bits.

In frames 450, 4500, directly after the FDF bit there follows the FXF bit, which, due to its position, here corresponds to the "res bit" in the CAN FD base frame format, as mentioned above. If the FXF bit is sent as 1, i.e., recessive, then it thereby identifies frames 450, 4500 as CAN FX frames. For a CAN FD frame, communication control device 11 sets the FXF bit as 0, i.e., dominant.

After the FXF bit, in frames 450, 4500 there follows a resFX bit, which is a dominant bit for future use. For the frames 450, 4500 the resFX must be sent as 0, i.e., dominant. However, if subscriber station 10 receives a resFX bit as 1, i.e., recessive, then the receiving subscriber station 10 goes for example into a protocol exception state, as is carried out in the case of a CAN FD message 46 for a res=1. The resFX bit could also be defined precisely inversely to this, i.e., that it has to be sent as 1, i.e., recessive, so that the receiving subscriber station goes into the protocol exception state when there is a dominant resFX bit.

After the resFXF bit, in frames 450, 4500 there follows a sequence BRS AD, in which a specified bit sequence is coded. This bit sequence permits a simple and secure changeover from the arbitration bit rate of arbitration phase 451 to the data bit rate of data phase 452. For example, the bit sequence of the BRS AD is made up of a recessive arbitration bit followed by a dominant data bit. In this example, the bit rate can be changed over at the edge between the two named bits.

After the sequence BRS AD, in the frames 450, 4500 there follows a DT field in which the data type (DT) of the useful data of data field for new 55 is indicated, which is described in more detail below. The DT field has a length of for example 1 byte; thus, $2^8=256$ different data types can be defined. Of course, a different length can be selected for the DT field. The data type characterizes the content of the data field 455 with respect to the type of information contained in data field 455. Depending on the value in the DT field, in data field 455 additional headers or trailers are also transmitted that are provided in addition to the actual user data. Alternatively, the DT field is situated at the beginning of data field 455, i.e., for example in the first byte of data field 455. With the DT field, additional functions can be realized, such as functional safety, data security, and quality of service (QoS, such as a guarantee of a maximum latency for a frame, time synchronization of the subscriber stations (nodes) in the bus system, etc.). In this way, the communication protocol is modular and is thus easily extensible in the future in order to add additional functions without having to change the frame format. New additional functions can be added in old implementations using software, so that the various implementations remain compatible. In this way, the communication protocol used for the bus system is also very flexibly extensible.

After the DT field, in frames 450, 4500 there follows a DLC (Data Length Code) field in which the data length code is inserted, which indicates the number of bytes in data field 455 of frames 450, 4500. The data length code (DLC) can assume any value from 1 up to the maximum length of data field 455, or the data field length. If the maximum data field length is in particular 2048 bits, then the data length code (DLC) requires 11 bits, under the assumptions that DLC=0 means a data field length having 1 byte, and DLC=2047 means a data field length having 2048 bytes data field length. Alternatively, a data field 455 having length 0 could be permitted, as for example in CAN. Here, DLC=0 would for example code the data field length having 0 bytes. With for example 11 bits, the maximum codable data field length is then (2^11)−1=2047.

After the DLC field, in frames 450, 4500 there follows a header checksum H_CRC. The header checksum is a checksum for securing the header of frame 450, i.e., all bits from the beginning of frames 450, 4500 with the SOF bit up to the beginning of header checksum H_CRC, including all dynamic, and optionally the fixed, stuff bits up to the beginning of header checksum H_CRC. The length of header checksum H_CRC, and thus of the checksum polynomial according to the cyclical redundancy check (CRC) is to be selected corresponding to the desired Hamming distance. The data word that is to be secured by header checksum H_CRC is, given a data length code (DLC) of 11 bits, longer than 27 bits. Therefore, the polynomial of header checksum H_CRC, in order to achieve a Hamming distance of 6, has to be at least 13 bits long. The calculation of the header checksum H_CRC is described in more detail below.

After header checksum H_CRC, there follows in frames 450, 4500 the data field 455. Data field 455 is made up of 1 to n data bytes, where n is for example 2048 bytes or 4096 bytes, or some other value. Alternatively, a data field length of 0 is possible. The length of data field 455 is coded in the DLC field, as described above. As described above, optionally the DT field is situated at the beginning of data field 455, i.e., for example in the first byte of data field 455.

After data field 455, in frames 450, 4500 there follows a frame checksum F_CRC. The frame checksum F_CRC is made up of the bits of frame checksum F_CRC. The length of frame checksum F_CRC, and thus of the CRC polynomial, is to be selected corresponding to the desired Hamming distance. The frame checksum F_CRC secures the overall frames 450, 4500. Alternatively, optionally only data field 455 is secured with frame checksum F_CRC.

After frame checksum F_CRC, in frames 450, 4500 there follows a sequence BRS DA, in which a specified bit sequence is coded. This bit sequence permits a simple and secure changeover from the data bit rate of data phase 452 to the arbitration bit rate of arbitration phase 451. For example, the bit sequence of the BRS DA is made up of a recessive data bit followed by a dominant arbitration bit. In this example, the changeover can take place at the edge between the two named bits.

After the sequence BRS DA, in frames 450, 4500 there follows a sync field in which a synchronization pattern (sync pattern) is held. The synchronization pattern is a bit pattern that permits a receiving subscriber station 10, 30 to recognize the beginning of arbitration phase 451 after data phase 452. The synchronization pattern permits receiving subscriber stations 10, 30, which do not know the correct length of data field 455, for example due to a false header checksum H_CRC, to synchronize with each other. Subsequently, these subscriber stations can send a "negative acknowledge" in order to communicate the faulty reception. This is very important in particular when CAN FX does not permit any more error frames 47 (error flags) in data field 455.

After the sync field, in frames 450, 4500 there follows an acknowledgment field (ACK field) that is made up of a plurality of bits, namely in the example of FIG. 2 one ACK bit, one ACK-dlm bit, one NACK bit, and one NACK-dlm bit. The NACK bit and the NACK-dlm bit are optional bits. The ACK bit is sent by the receiving subscriber stations 10, 30 as dominant if they have correctly received one of the frames 450, 4500. The sending subscriber station sends the ACK bit as recessive. Therefore, the bit originally sent in frame 450, 4500 to bus 40 can be overwritten by the receiving subscriber stations 10, 30. The ACK-dlm bit is sent as a recessive bit that is used for delimitation from other fields. The NACK bit and the NACK-dlm bit are used so that a receiving subscriber station can signal an incorrect reception of frame 450, 4500 on bus 40. The function of the bits is the same as that of the ACK bit and the ACK-dlm bit.

After the acknowledgment field (ACK field), there follows in frames 450, 4500 an end field (EOF=end of frame). The bit sequence of the end field (EOF) characterizes the end of frames 450, 4500. The end field (EOF) ensures that at the end of frames 450, 4500 8 recessive bits are sent. This is a bit sequence that cannot occur within frames 450, 4500. In this way, the end of frames 450, 4500 can be reliably recognized by subscriber stations 10, 20, 30.

The end field (EOF) has a length that is different as a function of whether a dominant bit or a recessive bit was seen in the NACK bit. If the sending subscriber station has received the NACK bit as dominant, then the end field (EOF) has 7 recessive bits. Otherwise, the end field (EOF) is only 5 recessive bits long.

After the end field (EOF), there follows in frames 450, 4500 an intermediate frame space (IFS: inter frame space). This inter frame space (IFS) is realized as in CAN FD, corresponding to ISO 11898-1:2015.

FIG. 2 and FIG. 3 indicate a specific example for the sequence of subdivisions of the header for frames 450, 4500. Alternatively, the sequence of subdivisions of the header can be differently sorted. For example, the DLC field can be situated before the DT field.

Figure 4:
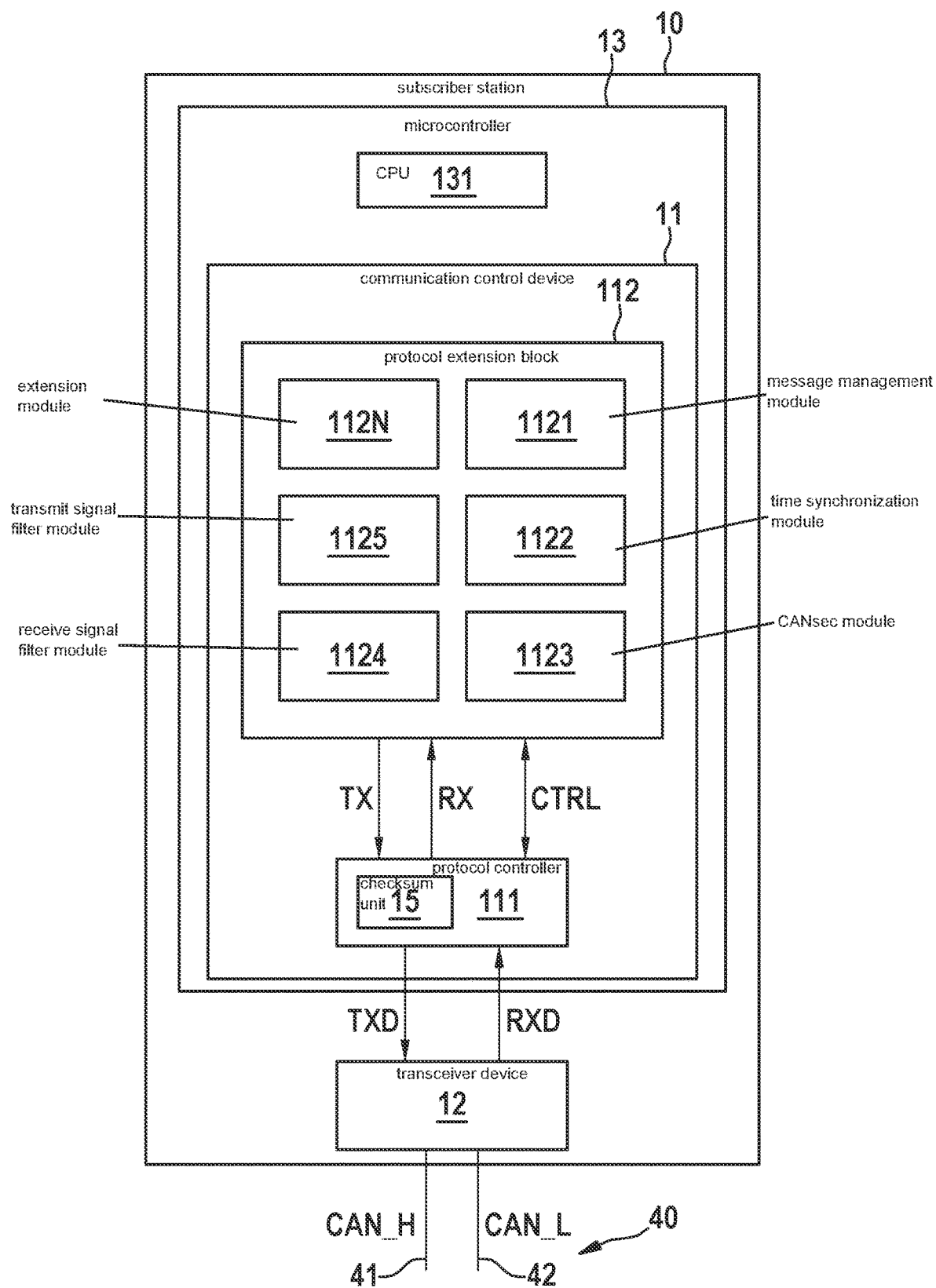
FIG. 4 shows a simplified schematic diagram of a subscriber station of the bus system according to the first exemplary embodiment of the present invention.

FIG. 4 shows the fundamental design of subscriber station 10 having communication control device 11, transceiver device 12, and checksum unit 15, which is part of communication control device 11, or more precisely its protocol controller 111. In addition, communication control device 11 has a protocol extension block 112 having at least one, but in particular a multiplicity of extension modules 1121 through 112N, such as a message management module 1121, a time synchronization module 1122, a CANsec module 1123, a receive signal filter module 1124, a transmit signal filter module 1125, etc. Any number of these modules or other modules may be provided and used.

Subscriber station 30 is designed in a manner similar to that shown in FIG. 4, but checksum unit 35 according to FIG. 1 is situated separately from communication control device 31 and transceiver device 32. Therefore, subscriber station 30 is not separately described.

According to FIG. 4, subscriber station 10 has, in addition to communication control device 11 and transceiver device 12, a microcontroller 13 to which communication control device 11 is assigned and that has a central processing unit (CPU) 131. In addition, standardly an energy supply device (not shown) is installed, which provides transceiver device 12 with electrical energy. The energy supply device standardly supplies a voltage CAN_Supply of 5 V. As needed, however, the energy supply device can also provide a different voltage having a different value. In addition or alternatively, the energy supply device can be realized as a current source.

Communication control device 11 is responsible for the implementation of the CAN FX functions in the first or second operating mode, which are explained above with reference to frames 450, 4500 of FIG. 2 and FIG. 3.

In protocol extension block 112, all higher-valued protocol extension functions are combined. Protocol extension block 112 is used for the evaluation of the DT field, i.e., the data type contained therein, and of the optionally present additional field for a data type in the useful data, and for carrying out the required handling of the message on the basis of an evaluation result. Here, protocol extension block 112 can have at least one module 1121 to 112N, which carries out the evaluation and the execution of the required handling of the message. Alternatively or in addition, the evaluation and/or the execution of the required handling of the message can be carried out by hardware. Alternatively or in addition, the evaluation and/or the execution of the required handling of the message can be carried out by software that runs on microcontroller 13 of subscriber station 10.

The functions can be implemented in modular fashion, i.e., by the individual modules 1121 to 112N. The protocol extensions, or protocol extension functions (protocol extensions) can thus easily be supplemented, and have no feedback effect on protocol controller 111. In principle, the protocol extensions can be implemented, alternatively or in addition, in software that is then executed on central processing unit 131 of microcontroller 13. Between protocol controller 111 and protocol extension block 112, a signal CRTL can be exchanged with which the transmission and reception can be controlled.

For example, message management module 1121 (message handler) stores a limited number of messages 45 that are to be sent and received. The required memory in which messages 45 are stored can alternatively be situated outside communication control device 11, such that the state information, i.e., for example whether a message 45 is stored, is stored in message management module 1121. If necessary, message management module 1121 can also send messages 45 in divided fashion to a plurality of smaller frames 450, 4500, and can receive messages 45 in divided fashion on a plurality of smaller frames 450, 4500—i.e., can assign the parts of message 45 to a message.

For example, time synchronization module 1122 (Time-Sync) can autarkically carry out the time synchronization, and for this purpose sends and receives CAN FX messages 45. Time synchronization module 1122 provides the information to the central processing unit 131.

For example, as needed the CANsec module 1123 secures messages 45 using cryptographic methods.

For example, receive signal filter module 1124 can filter incoming messages 45 in order to relieve the burden on central processing unit 131.

For example, transmit signal filter module 1125 can assign a priority ID (ID for arbitration) to the individual messages 45, and can dynamically adapt these IDs. Here, transmit signal filter module 1125 can also realize the changeover between the two operating modes, for changing between frames 450, 4500 of FIG. 2 and FIG. 3. In addition, transmit signal filter module 1125 can optionally ensure that a message 45 to be sent by the CANsec module is cryptographically secured before the message is then sent in encrypted fashion.

Checksum unit 15 calculates the above-described frame checksum F_CRC and the above-described header checksum H_CRC.

Transceiver device 12 has a transmitter and a receiver (not shown). Even if in the following reference is always made to transceiver device 12, it is alternatively possible to provide the receiver in a separate device external to the transmitter. The transmitter and the receiver can be constructed as in a conventional transceiver device 22.

Transceiver device 12 is connected to bus 40, or more precisely to its first bus lead 41 for CAN_H or CAN-FX_H, and to its second bus lead 42 for CAN_L or CAN-FX_L.

During operation of bus system 1, the transmitter of transceiver device 12 converts a transmit signal TXD of communication control device 11 into corresponding signals CAN-FX_H and CAN-FX_L for bus leads 41, 42, and sends these signals CAN-FX_H and CAN-FX_L to the terminals for CAN_H and CAN_L to bus 40. Transceiver device 12 implements layer 1 of the conventional OSI model; that is, transceiver device 12 physically codes the individual bits to be sent on bus 40, for example as a difference voltage VDIFF=CAN-FX_H−CAN-FX_L.

Figure 5:
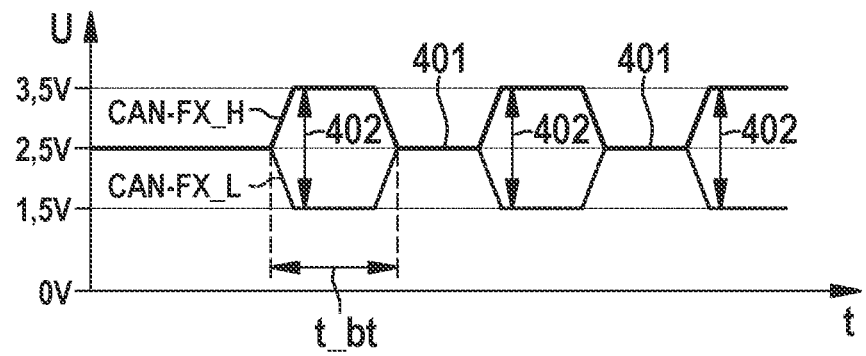
FIG. 5 shows a time curve of bus signals CAN_H and CAN_L, which in the subscriber station according to the first exemplary embodiment are bus signals CAN-FX_H and CAN-FX_L, in accordance with the present invention.

From signals CAN-FX_H and CAN-FX_L according to FIG. 5, which are received by bus 40, the receiver of transceiver device 12 forms a receive signal RXD and forwards this signal to communication control device 11, as shown in FIG. 4. With the exception of an idle or standby state, transceiver device 12, in normal operation, is always listening with the receiver for a transmission of data or messages 45, 46 on bus 40, independent of whether or not transceiver device 12 is the sender of message 45.

Figure 6:
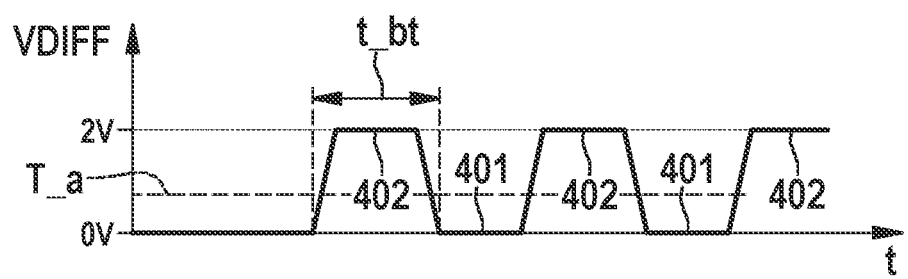
FIG. 6 shows a time curve of a difference voltage VDIFF of bus signals CAN-FX_H and CAN-FX_L in the subscriber station according to the first exemplary embodiment of the present invention.

According to the example of FIG. 5, the signals CAN-FX_H and CAN-FX_L have, at least in arbitration phase 451, the dominant and recessive bus levels 401, 402, as from CAN. On bus 40, there forms a difference signal VDIFF=CAN-FX_H−CAN-FX_L, which is shown in FIG. 6. The individual bits of the signal VDIFF having bit time t_bt can be recognized with a receive clamp of 0.7 V. In data phase 452, the bits of the signals CAN-FX_H and CAN-FX_L are sent faster, i.e., with a shorter bit time t_bt, than in arbitration phase 451. Thus, the signals CAN-FX_H and CAN-FX_L in data phase 452 differ at least in their higher bit rate from the conventional signals CAN_H and CAN_L.

The sequence of the states 401, 402 for the signals CAN-FX_H, CAN-FX_L in FIG. 4, and the curve resulting therefrom of the voltage VDIFF of FIG. 6, are used only to illustrate the function of subscriber station 10. The sequence of data states for bus states 401, 402 can be chosen as needed.

In other words, the transmitter of transceiver device 12, in a first operating mode, according to FIG. 4, produces a first data state as bus state 402 having different bus levels for two bus leads 41, 42 of the bus line, and a second data state as bus state 401 having the same bus level for the two bus leads 41, 42 of the bus line of bus 40.

Moreover, the transmitter of transceiver device 12, for the time curves of the signals CAN-FX_H, CAN-FX_L in a second operating mode that includes data phase 452, sends the bits to bus 40 with a higher bit rate. The CAN-FX_H and CAN-FX_L signals can in addition be produced in data phase 452 with a different physical layer than in CAN FD. In this way, the bit rate in data phase 452 can be increased still further than in CAN FD.

According to a second exemplary embodiment, subscriber station 10, as sender, in a first operating mode expects one of the frames 450, 4500, such that the FDF bit is received by bus 40 as it was sent by the transmitter. Otherwise, subscriber station 10 evaluates this as a format error, and aborts the sending of the frame 450, 4500 that is currently to be sent.

In addition, subscriber station 10 can be configured such that subscriber station 10 can be switched over to a second operating mode in which the arbitration behavior during the format changeover is modified compared to the first operating mode. In this way, in the second operating mode the arbitration is further continued by subscriber station 10, as sender, up to the FDF bit, as described above for frame 4500. The FDF bit is sent in recessive fashion in CAN FD frames and in CAN FX frames. In classical CAN frames, the FDF bit is sent as dominant.

Therefore, a sender that wishes to send one of the frames 450 and that has therefore sent the FDF bit as recessive, but instead sees a dominant bit on bus 40, will abandon the arbitration. As a consequence of this, the sender becomes receiver of a classical CAN frame. This option is referred to as "FDF arbitration."

The advantage of this variant is that in a case in which two senders in an arbitration phase each attempt simultaneously to send a classical CAN frame and a CAN FX frame, or a CAN FD frame and a CAN FX frame, with the same 11-bit identifier in each case, neither of the two frames is destroyed by an error frame 47. This is particularly helpful in the transition phase in the gradual introduction of CAN FX in mixed bus systems 1 that include CAN FX subscriber stations 10, 30 and CAN FD subscriber stations 20, as shown in FIG. 1. All subscriber stations 10, 20, 30 may then use the same identifiers.

This results in the following properties. On the one hand, classical CAN, CAN FD, and CAN FX frames can use the same identifiers. On the other hand, the arbitration also takes place during the format changeover that takes place in the FDF bit. In this way, the result is that, given the same identifiers, the priority of the frames is as follows. A classical CAN frame has a higher priority than a CAN FD or CAN FX frame. A CAN FD frame has a higher priority than a CAN FX frame.

According to a third exemplary embodiment, subscriber station 10 as sender, in a first operating mode, expects one of the frames 450, 4500 in such a way that the FXF bit is received from bus 40 as it was sent by the sender. Otherwise, subscriber station 10 evaluates this as a format error, and aborts the sending of the frame 450, 4500 that is currently to be sent.

In addition, subscriber station 10 can be configured such that subscriber station 10 can be switched over to a second operating mode in which the arbitration behavior during the format changeover is modified compared to the first operating mode. Thus, in the second operating mode the arbitration is further continued by subscriber station 10 as sender up to the FXF bit. In CAN FX frames, the FXF bit is sent as recessive. In CAN FD frames, such as frames 450, 4500, the FXF bit is sent as dominant. Thus, the arbitration also takes place during the format changeover that takes place in the FXF bit.

Therefore, a sender that wishes to send one of the frames 450, 4500 and that has therefore sent the FXF bit as recessive, but instead sees a dominant bit on bus 40, will abandon the arbitration. As a consequence of this, the sender becomes receiver of a CAN FD frame. This option is referred to as "FXF arbitration."

This variant also has the same advantage and the same properties as those named in the second exemplary embodiment. Thus, in the present exemplary embodiment as well all subscriber stations 10, 20, 30 can use the same identifiers. In particular, the same identifiers can be used for classical CAN, CAN FD, and CAN FX frames. Here, in the present exemplary embodiment the identifiers can be used multiple times. This increases the number of practically existing identifiers by a factor of 3, compared to the preceding exemplary embodiments.

All embodiments described above of subscriber stations 10, 20, 30 of bus system 1, and of the method carried out therein, can be used individually or in all possible combinations. In particular, all features of the exemplary embodiments described above and/or their modifications can be combined as desired. In addition or alternatively, in particular the following modifications are possible.

Even if the present invention has been described above for the example of the CAN bus system, the present invention can be used in any communication network and/or communication method in which two different communication phases are used in which the bus states differ that are produced for the different communication phases. In particular, the present invention can be used in developments of other serial communication networks, such as Ethernet and/or 100 Base-T1 Ethernet, field bus systems, etc.

In particular, bus system 1 according to the exemplary embodiments can be a communication network in which data can be transmitted serially with two different bit rates. It is advantageous, but is not a necessary precondition, that in bus system 1, at least for specified time spans, an exclusive, collision-free access of a subscriber station 10, 20, 30 to a common channel is ensured.

The number and the configuration of subscriber stations 10, 20, 30 in bus system 1 of the exemplary embodiments is arbitrary. In particular, subscriber station 20 in bus system 1 can be omitted. It is possible for one or more of subscriber stations 10 or 30 to be present in bus system 1. It is possible that all subscriber stations in bus system 1 have the same design, i.e., that only subscriber station 10 or only subscriber station 30 be present.

What is claimed is:

1. A subscriber station for a serial bus system, comprising:
   a communication control device configured to control a communication of the subscriber station with at least one other subscriber station of the bus system; and
   a transceiver device configured to send a transmit signal produced by the communication control device as a frame to a bus of the bus system, such that for a frame that is exchanged between subscriber stations of the bus system, a bit time of a signal sent to the bus in a first communication phase differs from the bit time of a signal sent in a second communication phase;
   wherein the communication control device is configured to produce the transmit signal, in a first operating mode, for a first frame that is configured according to a specified communication protocol with which other subscriber stations in the bus system communicate, and
   wherein the communication control device is configured to produce the transmit signal, in a second operating mode, for a second frame that assigns to at least one bit a different function than is assigned to the bit in the specified communication protocol.

2. The subscriber station as recited in claim 1, wherein the at least one bit has the bit time of the first communication phase.

3. The subscriber station as recited in claim 1, wherein the at least one bit in the first frame has a control function and has a fixed value defined in the specified communication protocol, and the at least one bit in the second frame has a function of a least significant bit of an identifier that is situated in the second frame directly after a bit that signals a start of the second frame.

4. The subscriber station as recited in claim 1, wherein an identifier of the first frame indicates a priority of a message, and an identifier of the second frame has information about a sender, content, and priority of a message.

5. The subscriber station as recited in claim 1, the at least one bit has at least one format changeover bit to which specified values are assigned for the changeover between the first and second communication phase in the communication protocol.

6. The subscriber station as recited in claim 5, wherein the at least one format changeover bit has an FDF bit and/or a FXF bit of a CAN FX frame.

7. The subscriber station as recited in claim 1, further comprising:
   a protocol extension block configured to evaluate a field for a data type and an optionally present additional field for a data type in useful data of the first and second frames, and to carry out required handling of a message based on an evaluation result.

8. The subscriber station as recited in claim 1, wherein the first or second frame formed for a message is constructed in a manner compatible with CAN FD.

9. The subscriber station as recited in claim 1, wherein, in the first communication phase, it is negotiated which of the subscriber stations of the bus system will receive, in a following, second communication phase, an at least at times exclusive, collision-free access to the bus.

10. A bus system, comprising:
  a bus; and
  at least two subscriber stations that are connected to one another via the bus in such a way that they can communicate serially with one another, and of which at least one subscriber station includes:
    a communication control device configured to control a communication of the subscriber station with at least one other subscriber station of the bus system, and
    a transceiver device configured to send a transmit signal produced by the communication control device as a frame to the bus of the bus system, such that for a frame that is exchanged between subscriber stations of the bus system, a bit time of a signal sent to the bus in a first communication phase differs from the bit time of a signal sent in a second communication phase,
    wherein the communication control device is configured to produce the transmit signal, in a first operating mode, for a first frame that is configured according to a specified communication protocol with which other subscriber stations in the bus system communicate, and
    wherein the communication control device is configured to produce the transmit signal, in a second operating mode, for a second frame that assigns to at least one bit a different function than is assigned to the bit in the specified communication protocol.

11. A method for communication in a serial bus system, the method being carried out with a subscriber station of the bus system that has a communication control device and a transceiver device, the method comprising the following steps:
  controlling, with the communication control device, a communication of the subscriber station with at least one other subscriber station of the bus system; and
  sending, with the transceiver device, a transmit signal produced by the communication control device as a frame to a bus of the bus system, such that for a frame that is exchanged between subscriber stations of the bus system, a bit time of a signal sent in a first communication phase to the bus differs from a bit time of a signal sent in a second communication phase, the communication control device producing the transmit signal, in a first operating mode, for a first frame that is configured according to a specified communication protocol with which other subscriber stations in the bus system communicate, and the communication control device producing the transmit signal, in a second operating mode, for a second frame that assigns to at least one bit a different function than is assigned to the bit in the specified communication protocol.

* * * * *